United States Patent
Lubischer et al.

(10) Patent No.: US 10,676,121 B2
(45) Date of Patent: Jun. 9, 2020

(54) RETRACTABLE STEERING COLUMN ASSEMBLY AND METHOD

(71) Applicant: Steering Solutions IP Holding Corporation, Saginaw, MI (US)

(72) Inventors: Frank P. Lubischer, Commerce Township, MI (US); Richard K. Riefe, Saginaw, MI (US); Joen C. Bodtker, Gaines, MI (US); Bryan L. Faist, Frankenmuth, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

(21) Appl. No.: 16/458,908

(22) Filed: Jul. 1, 2019

(65) Prior Publication Data

US 2019/0322306 A1   Oct. 24, 2019

Related U.S. Application Data

(63) Continuation of application No. 15/184,680, filed on Jun. 16, 2016, now abandoned.

(60) Provisional application No. 62/180,243, filed on Jun. 16, 2015, provisional application No. 62/185,113, filed on Jun. 26, 2015, provisional application No. 62/253,421, filed on Nov. 10, 2015, provisional application No. 62/253,921, filed on Nov. 11, 2015.

(51) Int. Cl.
| | |
|---|---|
| *B62D 1/181* | (2006.01) |
| *B62D 1/183* | (2006.01) |
| *B60N 3/00* | (2006.01) |
| *B62D 1/10* | (2006.01) |

(52) U.S. Cl.
CPC .............. *B62D 1/181* (2013.01); *B60N 3/00* (2013.01); *B60N 3/005* (2013.01); *B62D 1/105* (2013.01); *B62D 1/183* (2013.01)

(58) Field of Classification Search
CPC ........ B62D 1/183; B62D 1/181; B60R 21/203
See application file for complete search history.

(56) References Cited

U.S. PATENT DOCUMENTS

| | | | | |
|---|---|---|---|---|
| 3,782,492 A * | 1/1974 | Hollins | ................... | B60R 21/02 180/271 |
| 2004/0046379 A1* | 3/2004 | Riefe | ..................... | B62D 1/181 280/777 |
| 2007/0046013 A1* | 3/2007 | Bito | ...................... | B60R 21/203 280/777 |
| 2013/0002416 A1* | 1/2013 | Gazit | ...................... | B62D 1/28 340/438 |
| 2014/0028008 A1* | 1/2014 | Stadler | .................. | B62D 1/192 280/777 |

(Continued)

*Primary Examiner* — Faye M Fleming
(74) *Attorney, Agent, or Firm* — Dickinson Wright PLLC

(57) ABSTRACT

A selectively autonomous steering column assembly includes a steering column shaft. Also included is a steering input device coupled to the steering column shaft. Further included is a column adjustment assembly configured to translate the steering column shaft between a retracted position and a driving position. Yet further included is at least one signal indicating when the steering column shaft is in the driving position. When steering column shaft is in the retracted position, directional control is automated, and when the steering column shaft is returned to the driving position as indicated by the at least one signal, direction control via the steering input device is enabled.

5 Claims, 12 Drawing Sheets

(56) References Cited

U.S. PATENT DOCUMENTS

| | | | | |
|---|---|---|---|---|
| 2014/0277896 A1* | 9/2014 | Lathrop | ................... | B62D 1/04 |
| | | | | 701/23 |
| 2016/0244070 A1* | 8/2016 | Bendewald | ........... | B60W 50/08 |
| 2016/0347348 A1* | 12/2016 | Lubischer | .............. | B62D 1/181 |
| 2016/0362126 A1* | 12/2016 | Lubischer | .............. | B62D 1/183 |
| 2016/0368522 A1* | 12/2016 | Lubischer | .............. | B62D 1/181 |
| 2016/0375927 A1* | 12/2016 | Schulz | ................... | B62D 1/183 |
| | | | | 280/775 |
| 2016/0375928 A1* | 12/2016 | Magnus | .............. | F16H 25/2204 |
| | | | | 74/493 |
| 2017/0113589 A1* | 4/2017 | Riefe | ..................... | B60N 3/005 |
| 2018/0273081 A1* | 9/2018 | Lubischer | .............. | B62D 1/183 |

\* cited by examiner

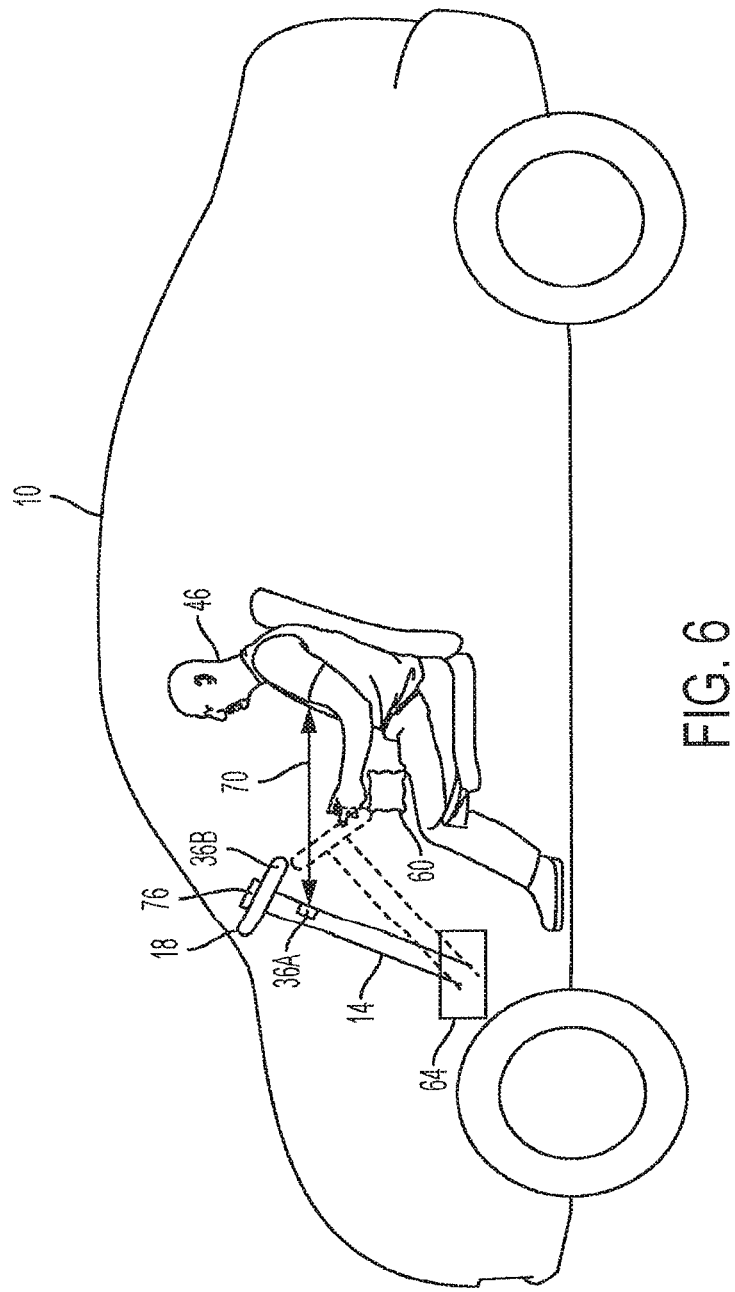

RETRACTABLE STEERING COLUMN ASSEMBLY AND METHOD

CROSS REFERENCE TO RELATED APPLICATIONS

This patent application claims priority to U.S. patent application Ser. No. 15/184,680, filed Jun. 16, 2016; U.S. Provisional Patent Application Ser. No. 62/180,243, filed Jun. 16, 2015; U.S. Provisional Patent Application Ser. No. 62/185,113, filed Jun. 26, 2015; U.S. Provisional Patent Application Ser. No. 62/253,421, filed Nov. 10, 2015; and U.S. Provisional Patent Application Ser. No. 62/253,921, filed Nov. 11, 2015, all of which are incorporated herein by reference in their entireties.

BACKGROUND

Vehicle steering wheels are typically used to steer a vehicle. When a vehicle is equipped with an autonomous driving assist steering ("ADAS") system, the steering wheel does not need to rotate as the self-driving system turns the road wheels. This non-rotation allows the steering column and wheel to have another use or purpose. For example, the steering wheel may assist with providing entertainment or a workspace.

SUMMARY

In one embodiment of the disclosure, a selectively autonomous steering column assembly includes a steering column shaft. Also included is a steering input device coupled to the steering column shaft. Further included is a column adjustment assembly configured to translate the steering column shaft between a retracted position and a driving position. Yet further included is at least one signal indicating when the steering column shaft is in the driving position. When the steering column shaft is in the retracted position, directional control is automated, and when the steering column shaft is returned to the driving position as indicated by the at least one signal, direction control via the steering input device is enabled.

According to another aspect of the disclosure, a selectively autonomous vehicle includes a steering column shaft. The vehicle also includes a steering input device coupled to the steering column shaft. The vehicle further includes a column adjustment assembly configured to translate the steering column shaft between a retracted position and a driving position. The vehicle yet further includes at least one signal indicating when the steering column shaft is in the driving position. When the steering column shaft is in the retracted position, directional control is automated, and when the steering column shaft is returned to the driving position, as indicated by the at least one signal, direction control via the steering input device is enabled.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIG. 6 is a schematic view of the steering column assembly illustrating another aspect of the disclosure;

DETAILED DESCRIPTION

Figure 1:
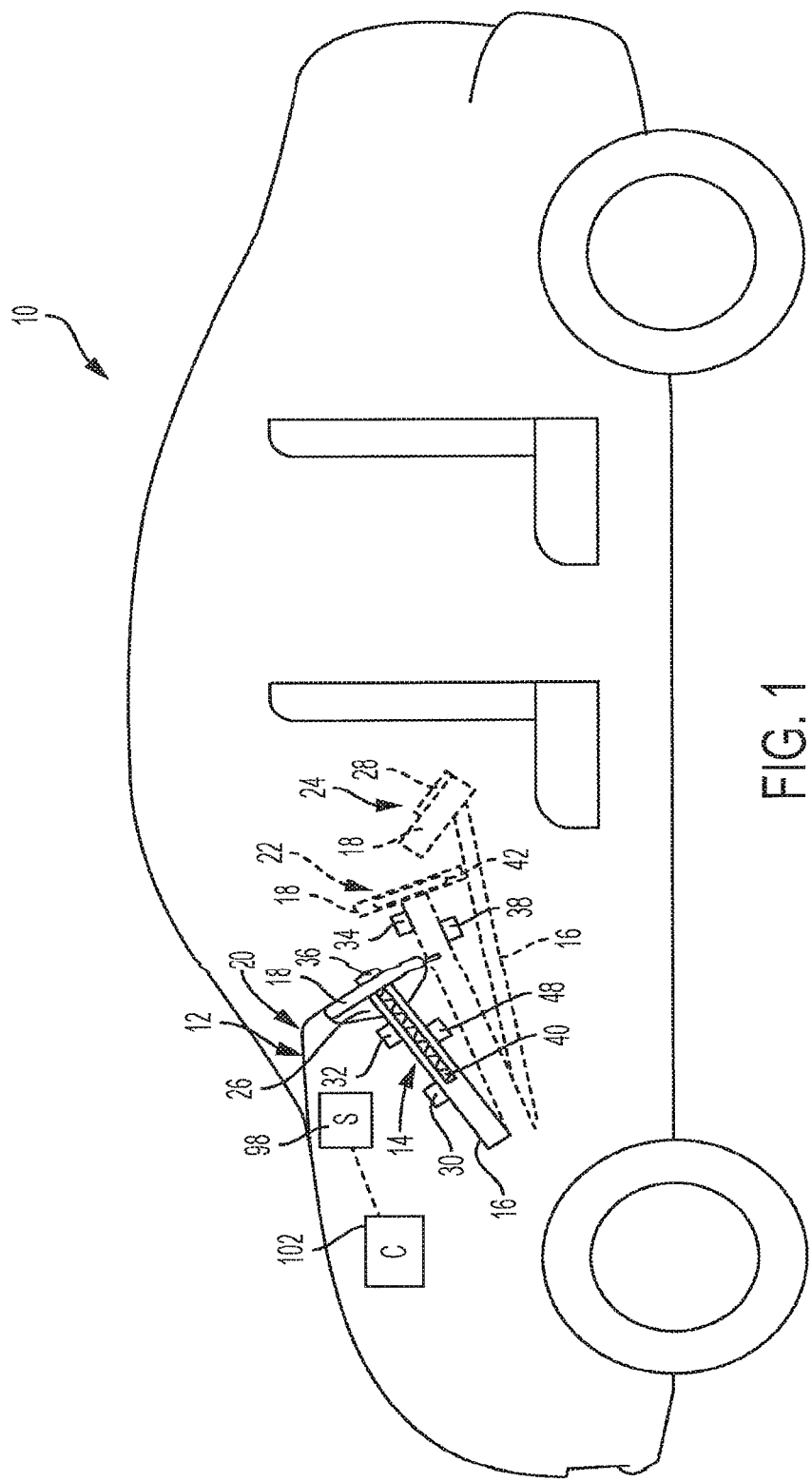
FIG. 1 is a schematic view of a vehicle and steering column assembly according to one embodiment of the disclosure.

Referring now to the Figures, where embodiments will be described, without limiting same, FIG. 1 illustrates an embodiment of a vehicle 10, such as an autonomous driving assisted steering ("ADAS") system equipped vehicle, generally having an instrument panel 12 and a retractable autonomous or selectively autonomous steering column assembly 14. Steering column assembly 14 generally includes a steering column shaft 16 and a steering input device, such as steering wheel 18, coupled thereto.

In the illustrated embodiment, steering column assembly 14 is movable between a retracted position 20, a deployed or driving position 22, and an accessory or utility position 24. In the retracted position 20, portions of the steering column assembly 14, such as steering wheel 18 are disposed away from the driver toward or into instrument panel 12, which provides increased space for the driver during autonomous driving. In the illustrated embodiment, instrument panel 12 includes one or more receiving compartments or areas 26 to receive some or all of steering column assembly 14. For example, receiving area 26 may be configured to receive steering wheel 18 such that wheel 18 and thus assembly 14 may be retracted within and flush with instrument panel 12. The displacement of the steering column shaft 16 and wheel 18 in retracted position 20 creates additional cabin space for the driver's comfort and convenience to perform non-driving activities including, but not limited to, reading, working, entertaining, eating, texting, etc.

Figure 2:
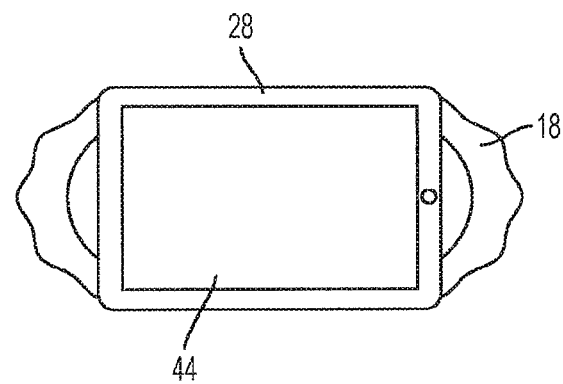
FIG. 2 is a plan view of an embodiment of a steering wheel for use in the vehicle of FIG. 1 when the steering column assembly of FIG. 1 is in an accessory/utility position.
Figure 9:
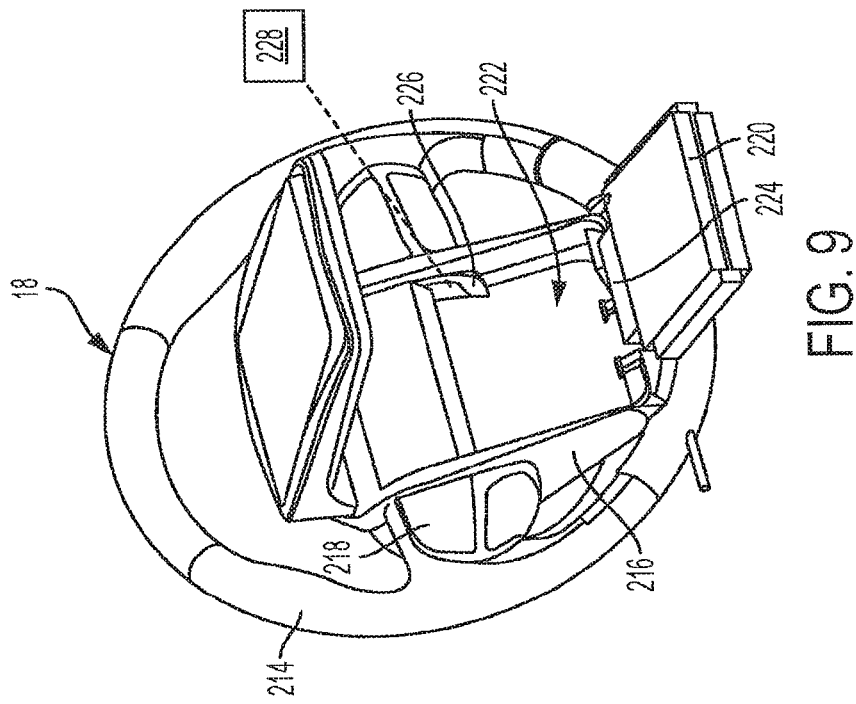
FIG. 9 is a perspective view of the steering wheel having an accessory disposed in a deployed condition.
Figure 8:
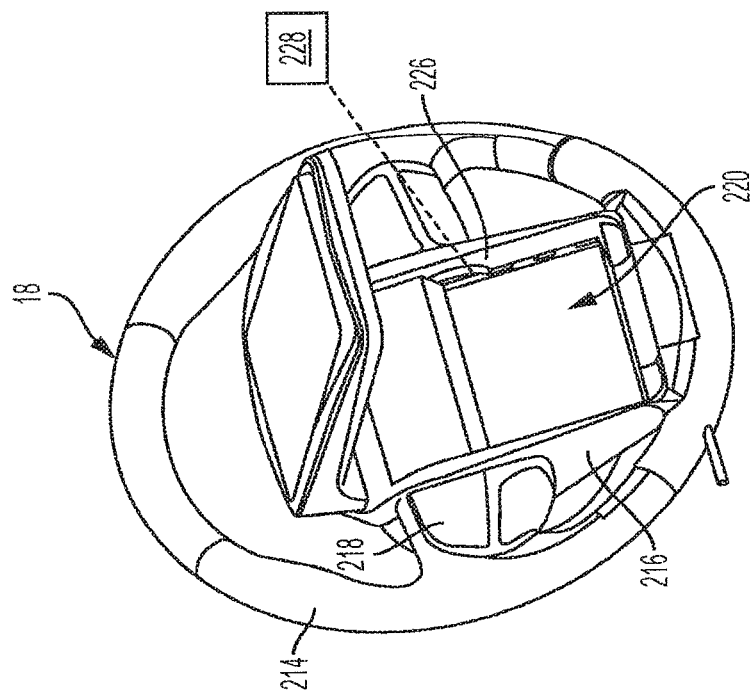
FIG. 8 is a perspective view of the steering wheel having an accessory disposed in a retracted condition.

In the driving position 22, steering wheel 18 may be used by a driver to steer the vehicle. While only one driving position 22 is shown, a plurality of driving positions 22 may be utilized to comfortably accommodate different drivers 46. In the accessory position 24, portions of assembly 14 such as steering wheel 18 may be used for non-driving activities such as reading, working, or other forms of entertainment. As such, at least a portion of steering wheel 18 is configured to be non-rotatable such that objects like computers or books may be rested thereupon. For example, a tray table or work surface 28 may be coupled to or integrated with steering wheel 18 to enable such activities, as further depicted in FIG. 2. Alternatively, only a rim or hub of the steering wheel is non-rotatable and includes attachments such as hooks to support work surface 28. In other embodiments, an electronic device or the like, such as but not limited to a tablet 44, is integrated into the stationary wheel 18 or work surface 28. Illustrative embodiments are shown in FIGS. 8 and 9 and described in more detail below.

In the illustrated embodiment, steering column assembly 14 further includes a steering column adjustment assembly 30, a decoupling assembly 32, a torque interface assembly 34, one or more sensors 36, and extension detection device 48. Adjustment assembly 30 is configured to move steering column assembly 14 for driver comfort (e.g., telescope or rake adjustment) and to move assembly 14 between the retracted position 20 and the driving position 22. Adjustment assembly 30 may include one or more mechanical/electrical mechanisms such as a motor. Adjustment assembly 30 may also include a retraction mechanism that enables a driver to mechanically, electronically, or manually return steering wheel 18 from the retracted position 20 to the driving position 22.

In one embodiment, decoupling assembly 32 is configured to selectively decouple one or more portions of assembly 14 (e.g., shaft 16) from a vehicle steering gear (not shown) and/or steering wheel 18 such that steering wheel 18 is in a non-rotatable mode. This decoupling assembly 32 may be mechanically or electrically activatable by a clutch, or by steer-by-wire, or counter-rotated by a servo-actuator, for example. Alternatively or additionally, assembly 32 may provide a counter rotation to wheel 18 to counteract any rotation of wheel 18 caused by the autonomous driver assisted steering system such that wheel 18 functions and appears as non-rotatable.

Figure 3:
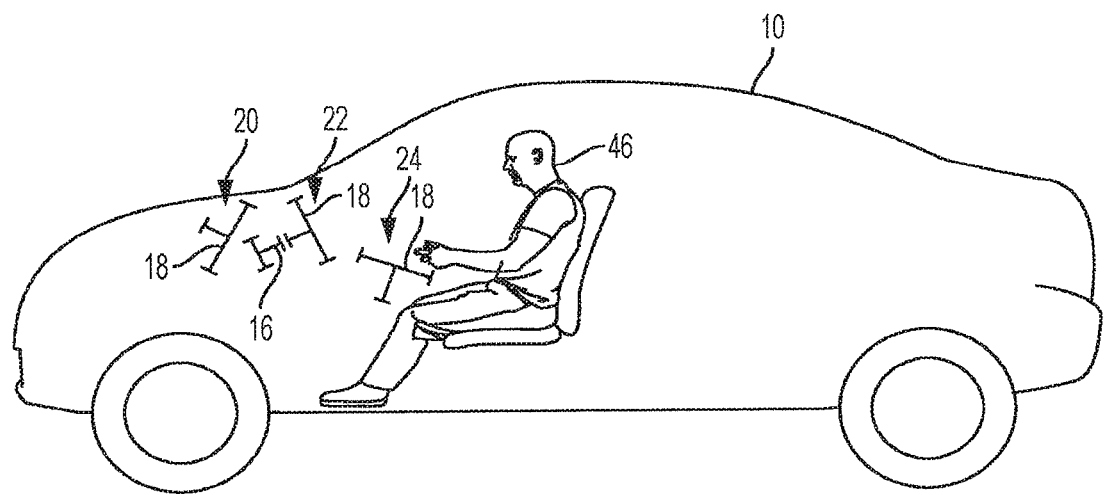
FIG. 3 is a schematic view of the vehicle of FIG. 1 further demonstrating different modes of the steering column assembly.

Further, the decoupling assembly 32 allows the steering column shaft 16 and wheel 18 to be displaced forward in the vehicle 10 to the retracted position 20 because the steering wheel 18 is no longer being used by the driver 46 to guide the vehicle 10. The retracting action may be accomplished by, for example, long stroke, electrical actuators responding to the driver's intention through a switch and motor controller, or by the driver manually releasing a clamp and pushing the steering wheel 18 and steering column shaft 16 forward to the retracted position 20. In any case, the embodiments described herein make retraction of the steering column shaft 16 and wheel 18 away from the driver possible in order to provide space for non-driving related activities such as working, reading, and game playing. The steering wheel 18 may, for example, be approximately 100 mm forward of the driver's normal driving position 22. As further shown in FIG. 3, the decoupling assembly 32 may also be used to re-couple one or more portions of assembly 14 (e.g., shaft 16) from the vehicle steering gear when the shaft 16 and wheel 18 are in the driving position 22 such that the steering wheel 18 is usable by the driver to directionally guide the vehicle 10, however the decoupling assembly 32 decouples the one or more portions of assembly 14 (e.g., shaft 16) from a vehicle steering gear when the shaft 16 and wheel 18 are in the retracted position 20 or utility position 24.

Figure 4:
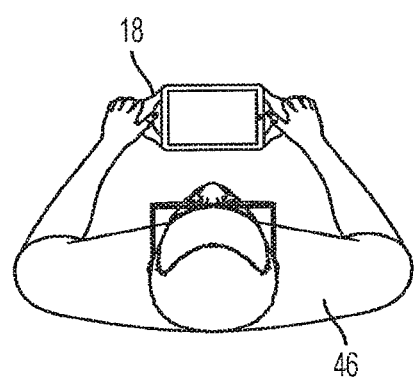
FIG. 4 is a schematic view of an operator engaging with an embodiment of the steering wheel for use with the vehicle of FIG. 1.

In one embodiment, torque interface assembly 34 is configured to detect and monitor driver torque input (rotational and translational) to steering wheel 18, for example, to determine if the driver 46 is in control of the vehicle 10, such as depicted by FIG. 4. As further shown in FIG. 1, sensors 36 are configured to detect and monitor driver compartment conditions, the driver's condition, the vehicle environment, and/or the vehicle control systems. For example, sensors 36 may: detect objects between the retracted steering wheel 18 and the driver 46 that may cause an unsafe situation for the driver to safely retake control of the vehicle; detect if the driver is not in a position to safely retake control of the vehicle; and/or detect undesirable vehicle dynamics that require the driver to retake control of the vehicle. Whether in the retracted position 20, the deployed/driving position 22, or the accessory/utility position 24, the fore-aft position of the steering column shaft 16 and wheel 18 is known by the ADAS system 98 by one or both of the torque interface assembly 34, the sensors 36, and extension detection device 48, which may be positioned on the steering column shaft 16 or wheel 18. The sensors 36A, 36B can be one or more of a SONAR device, a motion detection device, an optical sensor, a heat sensor, an infrared detector, a LIDAR device, a Radar device, switches and potentiometers. The preceding list is merely illustrative and not intended to be limiting.

The retracting or retracting process of moving the steering column shaft 16 and wheel 18 from the driving position 22 (or accessory/utility position 24) to the retracted position 20 must eventually be reversed to return steering control of the vehicle 10 to the driver 46. In the event that the driver 46 wishes to disengage the self-driving feature, the driver 46 may alert the ADAS system 98 of the desire to self-steer by gripping sensors on the wheel 18, applying steering torque to the wheel 18, or other sensory means that communicates the intention to take over driving the vehicle 10. That is, the driver 46 should be able to reach forward, grip the wheel 18, and be able to relatively quickly bring the wheel 18 to the driving position 22 to resume steering of the vehicle 10. When returned to the driving position 22, the steering column 16 and steering wheel 18 are fixed, at least temporarily, such as by the decoupling assembly 32 and/or a deactivatable, reversible lock 38, in that fore-aft position of the driving position 20. When fixed in the driving position 20, the vehicle 10 provides the ability to reduce the driver's kinetic energy, such as may result from a crash, via an energy absorbing mechanism 40 in the steering column shaft 16, the deformation of the steering wheel 18, and the deployment of the driver's air bag 42.

Figure 5:
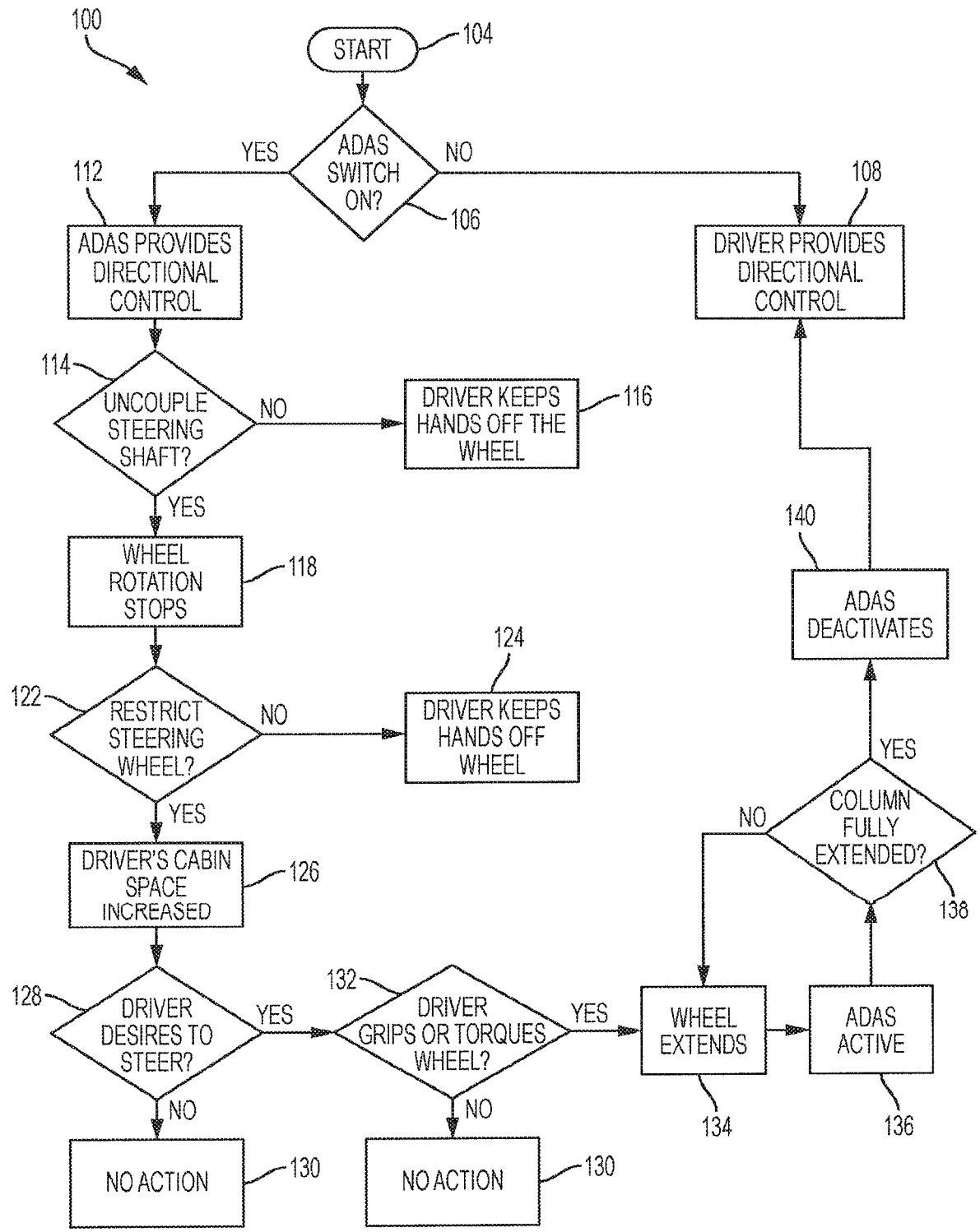
FIG. 5 is a flow diagram demonstrating an operation of the vehicle and steering column assembly according to one embodiment of the disclosure.

With reference now to FIG. 5, an embodiment of an operation 100 of the vehicle 10 is shown. A start 104 of the operation 100 may be assessed by a controller 102 of an ADAS system 98, shown diagrammatically in FIG. 1. The controller 102 may receive information (signal) from, but not limited to, one or more of the steering column adjustment assembly 30, decoupling assembly 32, torque interface assembly 34, sensors 36, reversible lock 38, extension detection device 48, as well as any other feature within the vehicle 10 that is communicable with the controller 102. The operation 100 will determine, as demonstrated by block 106, whether an ADAS switch of the ADAS system 98 is on. When the ADAS switch is not on, then, as demonstrated by block 108, a driver 46 may provide directional control.

When the ADAS switch is on, then, as demonstrated by block 112, the ADAS system 98 may provide directional control. The controller 102 further determines, as demonstrated by block 114, if the steering column shaft 16 has been decoupled yet, such as by decoupling assembly 32. If not, then as demonstrated by block 116, the driver 46 keeps hands off the steering wheel 18. If the steering column shaft 16 is decoupled, then as demonstrated by block 118, rotation of steering wheel 18 is stopped.

At some point during the operation 100, a driver 46 may wish to retract the steering wheel 18. The controller 102 will determine, such as via receipt of a signal, as demonstrated by block 122, if the column shaft 16 and wheel 18 are fully retracted during the retracting operation to position 20. If not, then as demonstrated by block 124, the driver 46 will keep hands off the steering wheel 18. However, if the steering column shaft 16 and wheel 18 are retracted in the retracted position 20, then as demonstrated by block 126, cabin space within the vehicle 10 is enlarged. At this point, the ADAS system 98 still provides directional control, as previously depicted at block 112.

The operation 100 will detect, as demonstrated at block 128, if the driver 46 provides an input that will demonstrate a desire to self-steer. If there is no input detected, no action will be taken, as demonstrated by block 130. However, if the driver 46 grips or torques the wheel as demonstrated by block 132 (and FIG. 4), then the wheel 18 may begin to extend, as demonstrated by block 134. If the driver 46 does not grip or torque the wheel 18, then no action will be taken, as noted again by block 130.

When the column shaft 16 and steering wheel 18 begin to extend, as noted by block 134, the steering wheel 18 may still be out of the driver's normal reach, and therefore resumption of driver steering in this interim position is not yet resumed. Instead, as noted by block 136, the ADAS system 98 remains active. That is, in an embodiment of the operation 100, the driver 46 is prohibited from using the steering wheel 18 to steer the vehicle 10 until the steering column shaft 16 and wheel 18 are fully returned from the retracted position 20 to the driving position 22. An extension detection device 48, such as electrical devices, switches, potentiometers, etc., mounted on the steering column shaft 16 or in an environment within sensing distance of the steering column shaft 16 signal the movement of the steering column shaft 16 to the ADAS system 98 to communicate the action. As demonstrated by block 138, if the steering column shaft 16 is fully extended, then the ADAS system 98 is deactivated, as demonstrated by block 140. At this time, the steering column shaft 16 is re-coupled, or the counter-rotation system is cancelled, or the steer-by-wire system is re-connected to enable steering wheel rotation aligned with the road wheel direction. However, if the steering column shaft 16 is not fully extended, then the shaft 16 may continue to extend as in block 134, and the ADAS system 98 will remain active, as in block 136, until it is determined by block 138 that the shaft 16 is indeed fully extended.

Thus, operation 100 thus ensures that the driver 46 is prohibited from providing steering input until the steering column shaft 16 is fully extended so that the driver is providing directional control 108 of the vehicle 10 only when the steering column shaft 16 is fully extended. During the short transition time from the retracted position 20 to the driving position 22, the ADAS system 98 remains active and guidance control is transferred to the driver 46 only when a signal is received, such as to controller 102, confirming the proper position for driving.

As described above, the steering column adjustment assembly 30 includes sensors 36 in some embodiments to ensure that movement from the retracted position 20 to the deployed position is safely made. Referring to FIG. 6, an embodiment having two sensors 36A, 36B is shown. The sensor 36A is disposed at the steering column assembly 14 and the sensor 36B is disposed at the steering wheel 18. Regardless of whether the sensors 36A, 36B are disposed at the column 14 or the steering wheel 18 or proximate the location within the cabin of a vehicle, the sensors 36A, 36B are configured to detect distances of objects 60 relative to the sensors 36A, 36B. Since relative locations of the sensors 36A, 36B to the steering column 14 and steering wheel 18 are known, the distances between the steering column 14 and the steering wheel 18 and the object 60 are also known.

The steering column adjustment assembly 30 uses output from the sensors 36A, 36B to stop movement of the steering column 14 by actuators 64 to the deployed position 22 when a distance to the object 60 is less than a distance to the driver 46 measured during a time when the steering column 14 is first retracted to the retracted position 20. In one embodiment, the steering column 14 is initiated to be moved from the retracted 20 position to the deployed position 22 upon input from the driver 46.

A proper distance is established by how near the sensors 36A, 36B, and by relative position thereto the steering wheel 18 and the steering column 14, can come to the object 60 before movement is halted. The proper distance can in part be determined as a percentage of a distance 70 from the sensors 36A, 36B to the driver 46 when the steering column 14 is initially retracted to the retracted position 20. The steering column adjustment assembly 30 uses output from the sensors 36A, 36B to stop moving the steering column 14 toward the deployed position 22 by the actuators 64 when a distance from the sensors 36A, 36B to the object 60 violates the proper distance.

An alert system 76 is configured to alert the driver 46 when the object 60 is in a position that output from the sensors 36A, 36B indicates the object 60 violates the proper distance. As such, the steering column 14 is halted from moving toward the deployed position 22.

Figure 7A:
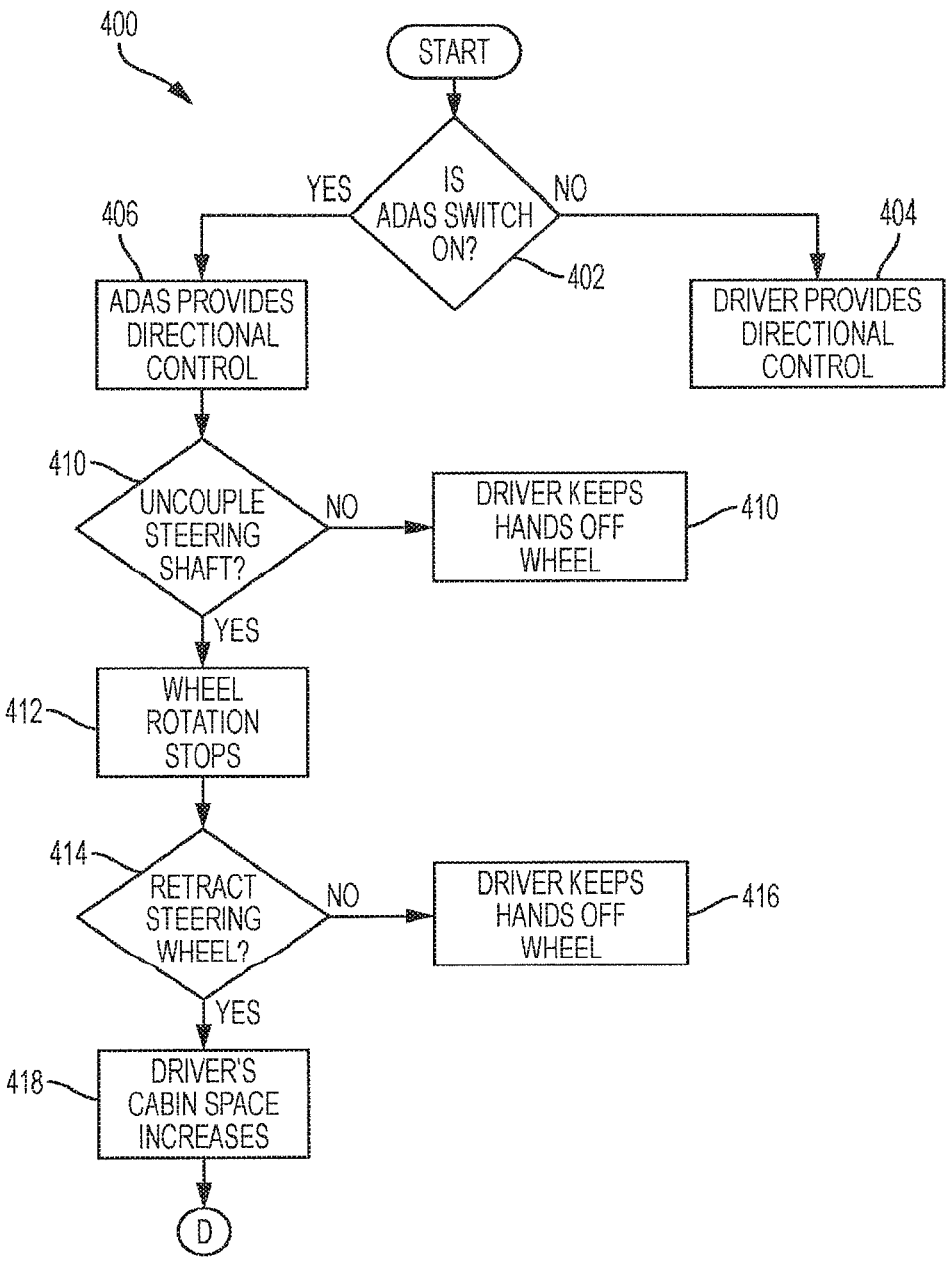
FIGS. 7A-7C illustrate a flow diagram demonstrating an operation of the vehicle and steering column assembly according to the embodiment illustrated in FIG. 6.
Figure 7B:
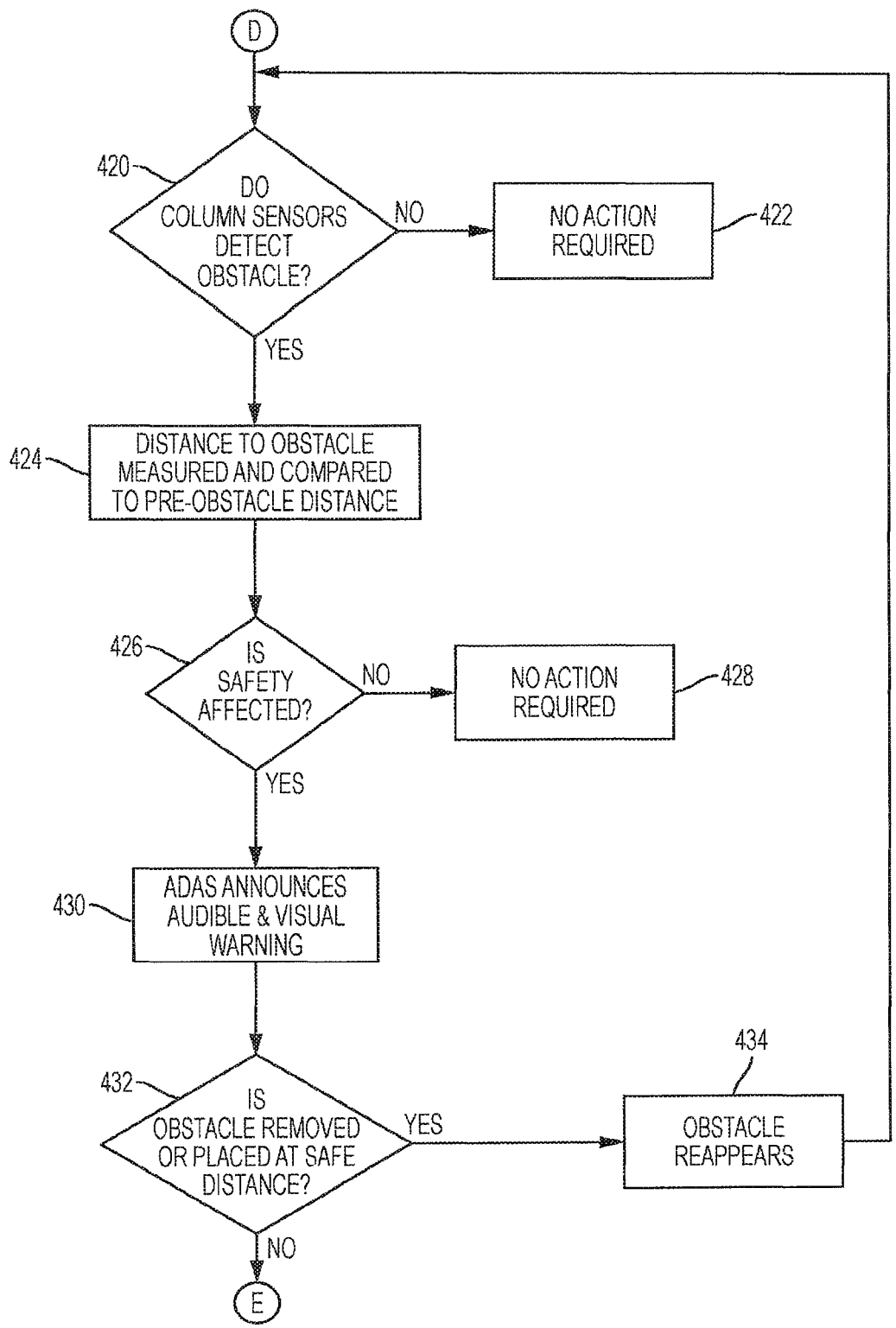
Figure 7C:
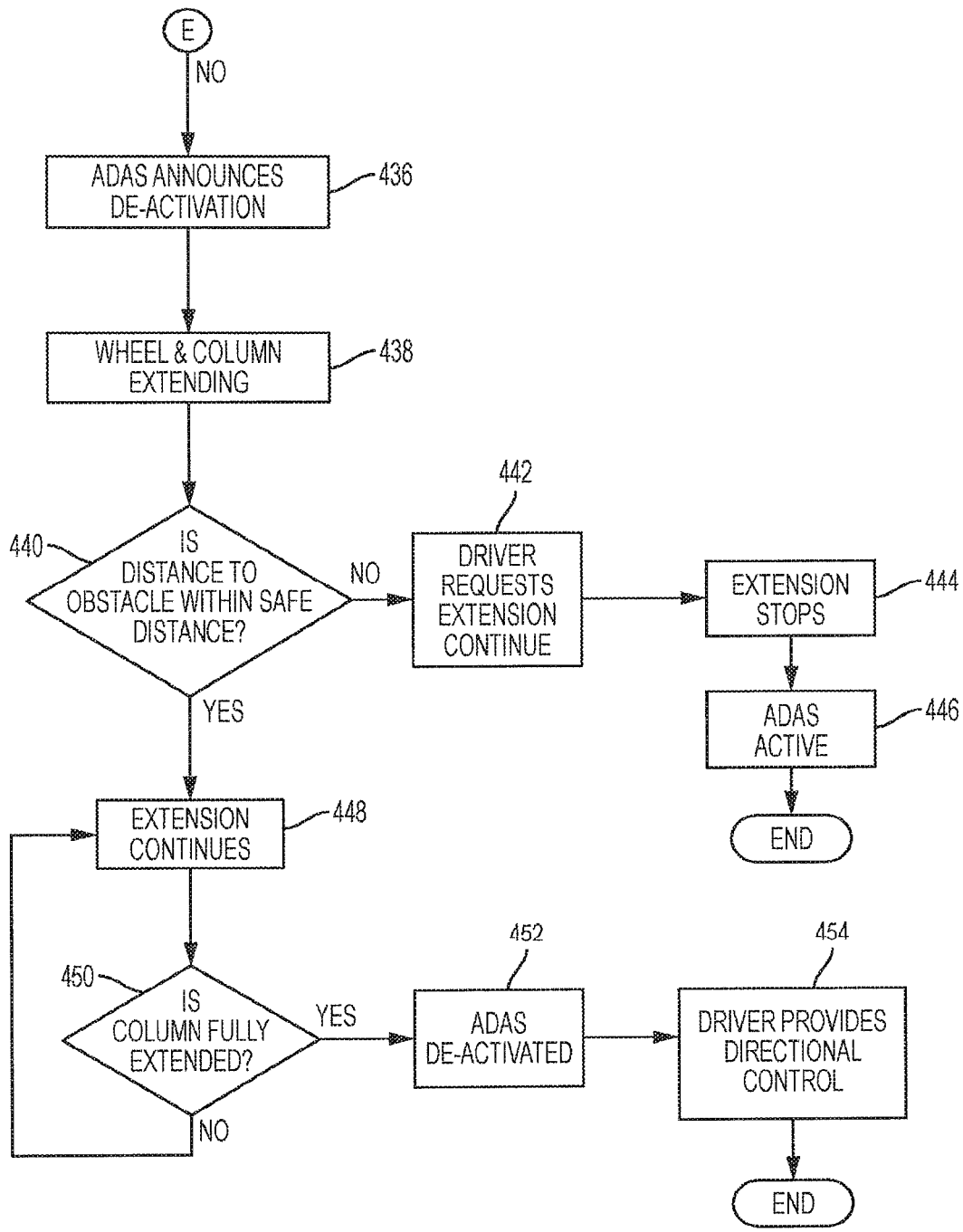

FIGS. 7A-7C is a flow diagram illustrating a method of operation of the object detection embodiment of FIG. 6. The method is generally referenced with numeral 400. The operation 400 will determine, as demonstrated by block 402, whether the ADAS switch of the ADAS system 98 is on. When the ADAS switch is not on, then, as demonstrated by block 404, a driver 46 may provide directional control.

When the ADAS switch is on, then, as demonstrated by block 406, the ADAS system 98 may provide directional control. The controller 102 further determines, as demonstrated by block 408, if the steering column shaft 16 has been decoupled yet, such as by decoupling assembly 32. If not, then as demonstrated by block 410, the driver 46 keeps hands off the steering wheel 18. If the steering column shaft 16 is decoupled, then as demonstrated by block 412, rotation of steering wheel 18 is stopped.

At some point during the operation 400, a driver 46 may wish to retract the steering wheel 18. The controller 102 will determine, such as via receipt of a signal, as demonstrated by block 414, if the column shaft 16 and wheel 18 are fully retracted during the retracting operation to position 20. If not, then as demonstrated by block 416, the driver 46 will keep hands off the steering wheel 18. However, if the steering column shaft 16 and wheel 18 are retracted in the retracted position 20, then as demonstrated by block 418, cabin space within the vehicle 10 is enlarged. In the retracted position 20, a determination 420 is made with the sensors 36A, 36B whether an obstacle, such as object 60, is present. If no obstacle is present, no action is required 422. If an obstacle is present, the distance to the obstacle is measured and compared to a pre-obstacle distance 424. Using the distance, a determination is made regarding whether safety is affected 426. This may be based on numerous factors pre-programmed into the controller. If safety is not affected, no action is required 428. If affected, the ADAS announces an audible and/or visual warning 430. It is then determined if the obstacle is removed or placed at a safe distance 432. If it is removed, monitoring for obstacle reappearance continues 434. If not removed, the ADAS announces deactivation 436 and the steering column shaft 16 is extended 438. During extension, monitoring for the obstacle continues 440. If a safe distance is not detected, but the driver continues to request extension 442, extension will stop 444 and the ADAS remains active 446. If the distance to the obstacle is safe, extension continues 448 and a determination is made whether the steering column is fully extended 450. If so, the ADAS is deactivated 452 and the driver provides directional control 454.

As described above, the steering wheel 18 may be used for non-driving activities while the vehicle 10 is operated autonomously or semi-autonomously. FIGS. 8 and 9 illustrate an embodiment of the steering wheel 18. The steering wheel 18 includes an outer handle 214, a hub 216 and at least one spoke 218 connecting the outer handle 214 and the hub 216. It is to be appreciated that there are numerous types of steering wheel configurations and the illustrated type is not limiting of the steering wheels which may benefit from the accessory and control system described herein.

Irrespective of the particular type of steering wheel configuration, the hub 216 includes an accessory 220 integrated therein. Reference to an integrated accessory differs from an accessory that is easily coupled to the steering wheel 18, such as in a clipped on manner. The integrated assembly of the accessory 220 with the hub 216 provides a more permanent connection that allows the accessory 220 to be moved between the retracted condition (FIG. 8) and a deployed condition (FIG. 9). In the retracted condition, the accessory 220 is positioned relative to the hub 216 in a manner that does not impede a driver during operation of the vehicle in a non-autonomous driving mode (i.e., manual driving mode). Although illustrated as being disposed within a recess 222 (e.g., pocket) of the hub 216 in the retracted condition, it is to be understood that the accessory 220 may be manipulated to be stored in an alternative manner. In the illustrated embodiment, the accessory 220 is rotated between the retracted condition and the deployed condition about a hinge region 224. Alternatively, the accessory 220 may be primarily translated (e.g., slid) between the retracted and deployed conditions in some embodiments. In yet further embodiments, a combination of rotation and translation are employed.

Regardless of the manner in which the accessory 220 is manipulated from the retracted condition to the deployed condition, a latch 226 or a similar component retains the accessory 220 in the retracted condition until certain conditions are satisfied, the conditions monitored by the accessory control system described herein. In particular, the control system prevents deployment of the accessory 220 when it is inadvisable to do so from a driving perspective. This is physically ensured by maintaining the latch 226 or other similar component in a latched position until the control system detects that certain conditions are met. Upon detection of such conditions (described below), the latch 226 is movable to an unlatched position, thereby allowing for deployment of the accessory 220. In some embodiments, the latch 226 is an electromechanical device that is in operative communication with a controller 228. The controller 228 is in communication with the above-described ADAS system 98. The controller 228 is configured to receive, transmit, store and/or process a variety of data related to conditions related to controlling operation of the latch 226 and the accessory 220.

Figure 10:
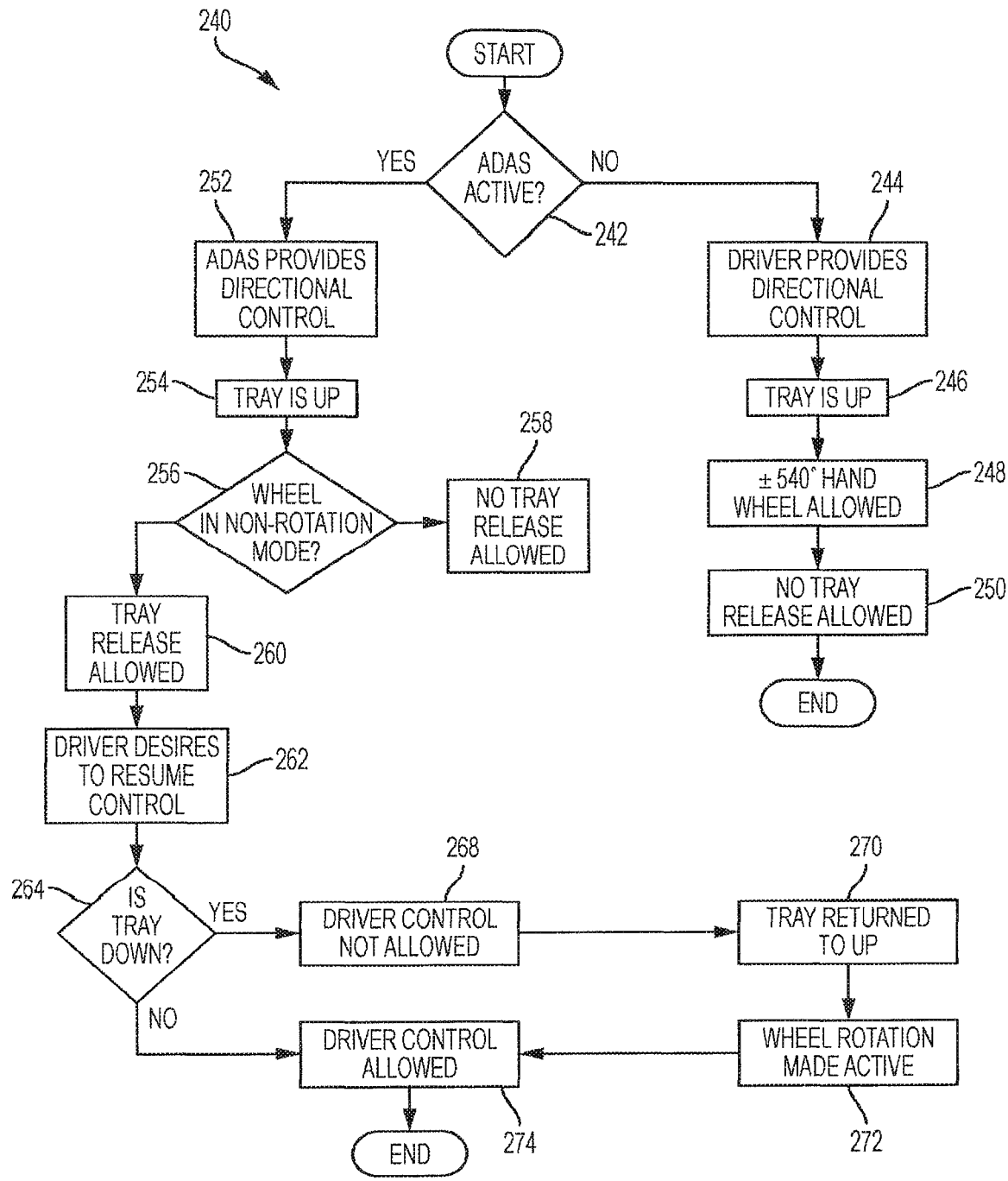
FIG. 10 is a flow diagram representing a control system and method associated with operation of the accessory and steering wheel of FIGS. 8 and 9.

Referring now to FIG. 10, a flow diagram illustrates a method 240 of operation of the accessory control system. The features of the method 240 are facilitated, at least in part, by the controller 228 and the ADAS system 98. As will be appreciated from the description herein, the method determines whether the accessory 220 is permitted to be retracted or deployed, the determination based on at least one monitored condition of the steering wheel 18 and whether the vehicle is in an autonomous driving mode.

The method 240 includes detecting 242 whether the ADAS system is active. In other words, a determination is made regarding whether the vehicle is in an autonomous driving mode. If the vehicle is not in such an autonomous driving mode and is therefore in a non-autonomous driving mode, the driver is providing directional control 244 of the vehicle by manually commanding the steering wheel 18. In such a driving mode, the accessory 220 is in the retracted (e.g., stowed) condition 246 within the hub 216 of the steering wheel 18. The steering wheel 18 is permitted to undergo a full range of rotation 248, such as the illustrated +/−540 degrees of rotation. To reduce the likelihood of inhibiting the driver's operation of the steering wheel 18, the accessory 220 is prevented from being moved to the deployed condition 250. As described above, the latch 226 is controlled by the controller 228 and is maintained in a latched or locked position to prevent the accessory 220 from being deployed.

If the vehicle is in an autonomous driving mode, the ADAS system is providing directional control 252 of the vehicle by autonomously commanding the steering wheel 18. In such a driving mode, the accessory 220 is in the retracted (e.g., stowed) condition 254 within the hub 216 of the steering wheel 18. The steering wheel 18 is configured to be switched by the ADAS system between a rotational mode and a non-rotational mode. The non-rotational mode is desirable during autonomous driving for several reasons, including avoiding movement of accessories associated therewith, such as the accessory 220 described herein. A determination 256 is made regarding whether the steering wheel 18 is in the non-rotational mode. If it is not, the accessory 220 is not permitted to be released and moved 258 to the deployed condition. If it is in the non-rotational mode, the accessory 220 is permitted to be released 260 to the deployed condition.

Once the vehicle operator desires to resume manual control of the vehicle 262 by switching from the autonomous driving mode to the non-autonomous driving mode, a determination 264 is made regarding whether the accessory 220 is in the deployed condition. If the accessory 220 is not in the deployed condition, the ADAS system permits switching of the vehicle driving mode to the non-autonomous driving mode. This condition is required based on the advantage of avoiding manual operation of the steering wheel 18 while the accessory is deployed. If the accessory 220 is in the deployed condition, switching to the non-autonomous mode is not permitted 268. Before the non-autonomous driving mode is established, the accessory 220 is moved to the retracted condition 270, the steering wheel 18 is switched to the rotational mode 272, and the non-autonomous driving mode is established 274.

In addition to the conditions described above, the accessory control system monitors an angle that the steering wheel 18 is positioned at relative to a "top center" angular position that corresponds to a directional control input of the vehicle in a straight direction. In order to switch the vehicle from an autonomous driving mode to a non-autonomous driving mode, the accessory 220 must be up, as described above, and the steering wheel 18 must be within a predetermined range of angular offset from the top center position. In some embodiments, the range is between about −15 degrees and +15 degrees. In other embodiments, the range is between about −5 degrees and +5 degrees. In further embodiments, the range is between about −1 degree and +1 degree.

The ability to deploy the accessory 220 from the retracted condition to the deployed condition is also dependent on the steering wheel angle in some embodiments. For example, when the vehicle is in the autonomous driving mode, the accessory 220 is only permitted to be deployed when the steering wheel 18 is within a predetermined range of angular offset from the top dead center position. In some embodiments, the range is between about −15 degrees and +15 degrees. In other embodiments, the range is between about −5 degrees and +5 degrees. In further embodiments, the range is between about −1 degree and +1 degree.

Advantageously, operating conditions of the steering wheel 18 and, more broadly, the vehicle are monitored to determine if transition between the autonomous driving mode and the non-autonomous mode is permitted. Additionally, the conditions are employed to determine if transitions related to the accessory are permitted.

To reduce the likelihood of inhibiting the driver's operation of the steering wheel 18, the accessory 220 is prevented from being moved to the deployed condition 250. As described above, the latch 226 is controlled by the controller 228 and is maintained in a latched or locked position to prevent the accessory 220 from being deployed.

As described herein, multiple positions and states of the steering column assembly may be achieved during the autonomous driving mode. Specifically, the steering column may be in the extended position or the retracted position and the steering wheel may be in a rotational state or potentially a non-rotational state. As described in detail below, these positions and conditions are monitored and processed to determine if transitions between the autonomous and non-autonomous driving modes may be made. Transitioning between the driving modes requires certain conditions to be met to ensure that efficiency and safety considerations are met. As will be appreciated, the steering column and wheel may be retracted and switched to the non-rotational state if predetermined driver, vehicle and environmental conditions are satisfied. Similarly, the steering column and wheel may be switched to the rotational state if predetermined conditions are satisfied.

Figure 11A:
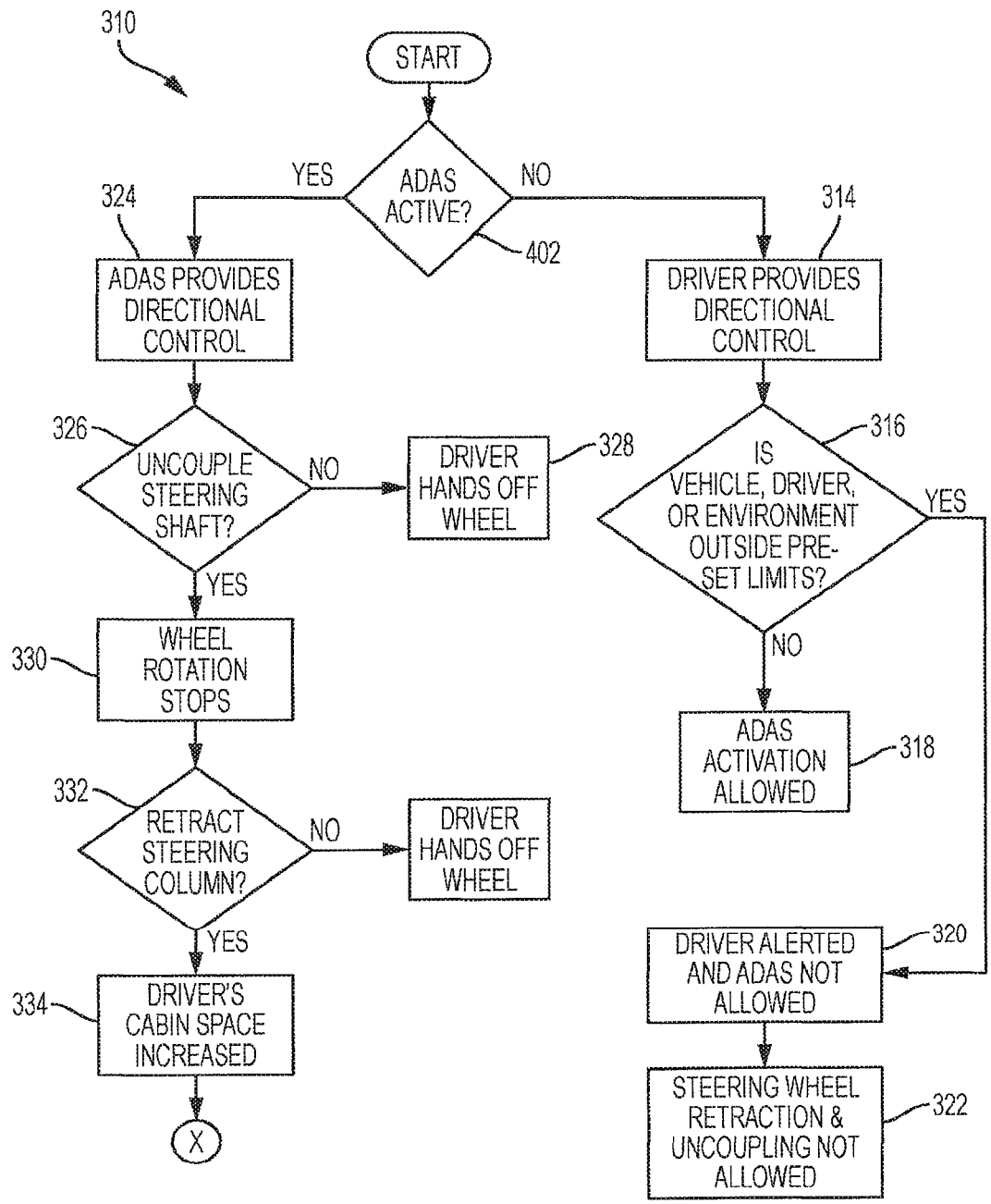
FIGS. 11A-11C is a flow diagram representing a control system and method associated with operation of the steering column assembly.
Figure 11B:
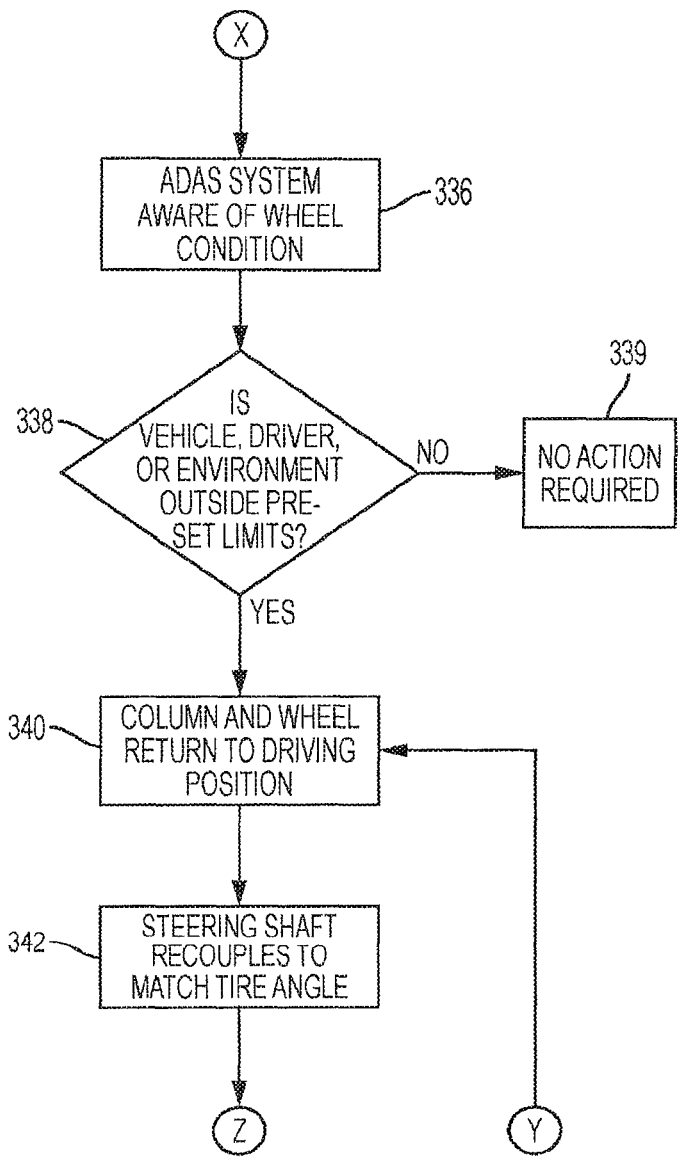
Figure 11C:
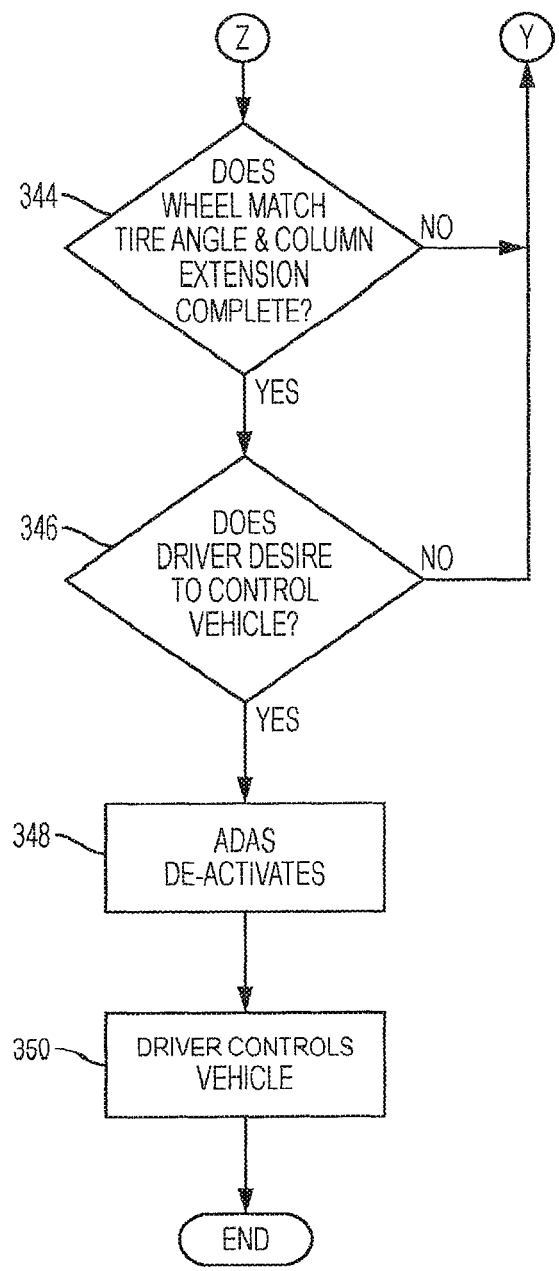

Referring now to FIGS. 11A-11C, a flow diagram illustrates a method of operation of the steering column control system, the method generally referenced with numeral 310. The method 310 includes determining 312 if the ADAS system is active to ascertain whether the vehicle is in the autonomous driving mode or the non-autonomous driving mode. If the ADAS system is not active, the steering wheel is in the rotational state and the driver provides directional control 314. If the driver desires to switch to the autonomous driving mode, the control system determines 316 if predetermined conditions are satisfied, such as by ensuring that certain detected conditions are within predefined limits.

The conditions evaluated and required to enact the driving mode switch from non-autonomous to autonomous may vary depending upon the particular application. Illustrative conditions include vehicle detection of conditions related to lateral acceleration, yaw rate, road wheel angle change, engagement of the emergency brake system, or low tire pressure. Additionally, conditions detected by a vehicle-to-infrastructure system are monitored by the ADAS system. Such conditions include nearby traffic density, vehicle speeds, and road and weather conditions. Also impacting the conditions analysis is whether the driver indicates the desire to join or decline membership in a highway road train or platoon. The presence of a diagnostic trouble code is also considered in some embodiments, particularly for diagnostic codes relating to sensors relied upon by the ADAS system, such as a steering shaft angular position sensor, for example.

If the ADAS system confirms that the evaluated conditions are not outside of predefined limits, the vehicle is permitted to switch 318 to the autonomous driving mode. However, if the ADAS system detects at least one condition outside of the predefined limits, the driver is alerted and the autonomous driving mode is not permitted 320. As such, retraction of the steering wheel and switching to the non-rotational state of the steering wheel is not permitted 322.

As discussed above, the method 310 includes determining 312 if the ADAS system is active to ascertain whether the vehicle is in the autonomous driving mode or the non-autonomous driving mode. If the ADAS system is active, the ADAS system provides directional control 324 of the vehicle. It is determined if the driver desires the steering wheel to be in the non-rotational state 326. If the steering wheel is not to be in the non-rotational state, the driver must keep his/her hands off of the steering wheel 328, but if the driver desires the non-rotational state the steering wheel stops rotation 330. A determination is made whether the steering column is to be in the retracted position 332. If it is not to be retracted and is maintained in the extended position, the driver keeps his/her hands off of the steering wheel. If the steering column is moved to the retracted position, the cabin space is increased for the driver 334, thereby expanding the non-driving options available to the driver.

The ADAS system is configured to receive and process data associated with the position (e.g., extended or retracted) of the steering column and the rotational state of the steering wheel 336. If the driver desires to regain directional control of the vehicle by switching from the autonomous driving mode to the non-autonomous driving mode, the control system determines 338 if predetermined conditions are satisfied, such as by ensuring that certain detected conditions are within predefined limits.

The conditions evaluated and required to enact the driving mode switch from autonomous to non-autonomous may vary depending upon the particular application. Illustrative conditions include vehicle detection of conditions related to lateral acceleration, yaw rate, road wheel angle change, engagement of the emergency brake system, or low tire pressure. In the autonomous driving mode, a vehicle-to-vehicle communications system detects whether an adjacent ADAS driven vehicle is about to disengage from the self-driving mode and if the driver of an adjacent vehicle becomes impaired. These conditions are factored into the overall condition analysis. Additionally, conditions detected by a vehicle-to-infrastructure system are monitored by the ADAS system. Such conditions include nearby traffic density, vehicle speeds, and road and weather conditions. The presence of a diagnostic trouble code is also considered in some embodiments, particularly for diagnostic codes relating to sensors relied upon by the ADAS system, such as a steering shaft angular position sensor, for example.

If the ADAS system confirms that the evaluated conditions are not outside of predefined limits, no action is required 339. However, if the ADAS system detects at least one condition outside of the predefined limits, the driver is alerted and the steering column is moved to the extended position 340 and the non-rotational portions of the steering shaft (e.g., steering wheel) are recoupled to match the steering wheel angle to the tire angle 342. This matching places the steering shaft and wheel in position for a seamless transition to the non-autonomous driving mode, if desired by the driver. A determination 344 is made to verify that the steering wheel angle matches the tire angle and that the steering column has been fully extended to the extended position. If verification cannot be made the control system returns to step 340 to initiate movements to obtain such positioning. If verification occurs, a determination 346 is made regarding whether the driver desires to control the vehicle in a non-autonomous mode. If not, the control system returns to step 340. If the driver desires directional control of the vehicle, the ADAS system deactivates 348 and the driver is enabled to directionally control the vehicle 350.

Advantageously, transitions between an autonomous driving mode and a non-autonomous driving mode are monitored and controlled in the context of a steering column.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A selectively autonomous steering column assembly comprising:
   a steering column shaft;
   a steering input device coupled to the steering column shaft;
   a column adjustment assembly configured to translate the steering column shaft between a retracted position and a driving position; and
   at least one signal generating sensor mounted on the steering column shaft, the at least one signal generating sensor indicating when the steering column shaft is in the driving position;
   directional control being automated when the steering column shaft is in the retracted position, and when the steering column shaft is returned to the driving position as indicated by the at least one signal, direction control via the steering input device is enabled.

2. The steering column assembly of claim 1, further comprising at least one sensor configured to monitor at least one of driver compartment conditions, a driver's condition, a vehicle environment, and a vehicle control system.

3. A selectively autonomous vehicle comprising:
   a steering column shaft;
   a steering input device coupled to the steering column shaft;
   a column adjustment assembly configured to translate the steering column shaft between a retracted position and a driving position; and
   at least one signal generating sensor located adjacent the steering column shaft to detect a position of the steering column shaft, the at least one signal generating sensor indicating when the steering column shaft is in the driving position;
   directional control being automated when the steering column shaft is in the retracted position and when the steering column shaft is returned to the driving position as indicated by the at least one signal, direction control via the steering input device is enabled.

4. The vehicle of claim 3, further comprising an autonomous driving assisted steering system having a controller, the controller configured to receive the at least one signal.

5. The vehicle of claim 3, further comprising an instrument panel including at least one receiving compartment configured to receive at least a portion of the steering column assembly when the steering column assembly is in the retracted position.

* * * * *